Sept. 4, 1934.     M. M. CUNNINGHAM     1,972,550
BRAKE SHOE
Filed April 8, 1931
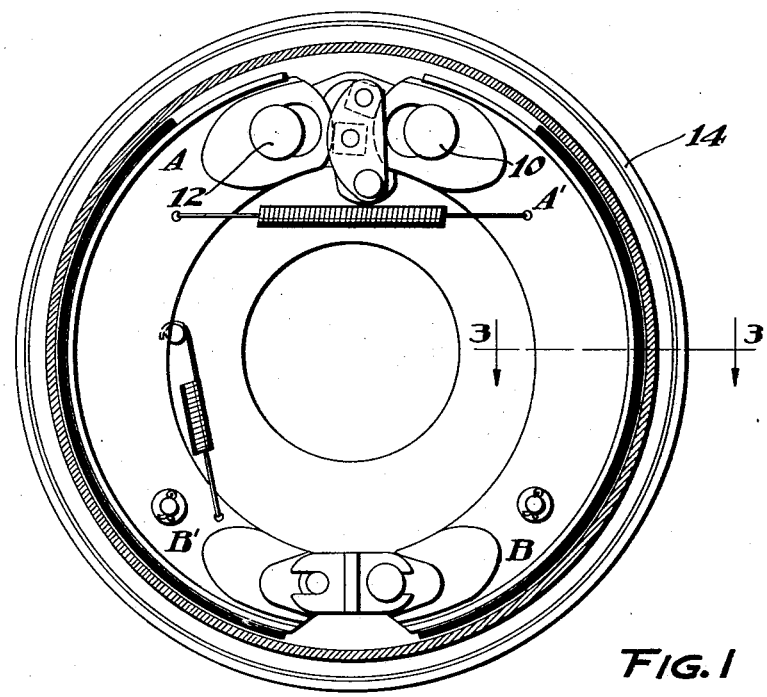
FIG.1
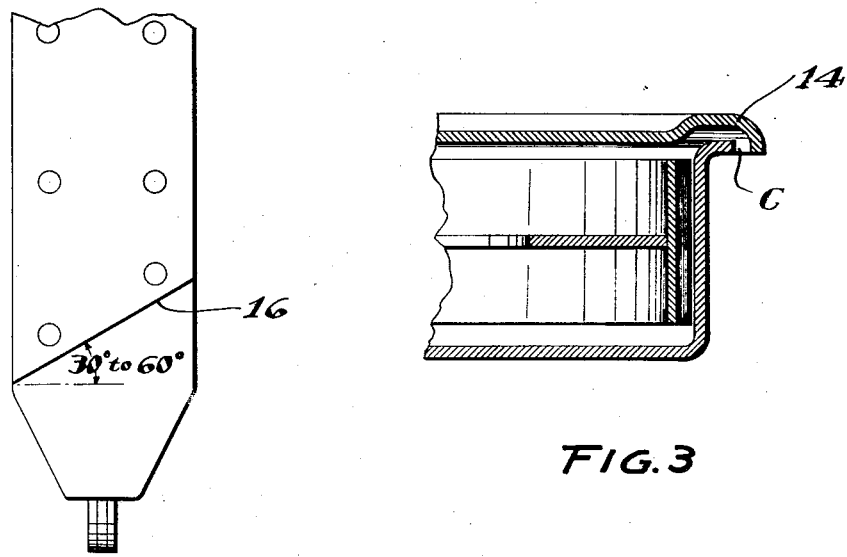
FIG.2
FIG.3
INVENTOR.
MARION M. CUNNINGHAM
BY H. O. Clayton
ATTORNEY.

Patented Sept. 4, 1934

1,972,550

UNITED STATES PATENT OFFICE 1,972,550

BRAKE SHOE

Marion Morgan Cunningham, South Bend, Ind., assignor to Bendix Brake Company, South Bend, Ind., a corporation of Illinois Application April 8, 1931, Serial No. 528,507

2 Claims. (Cl. 188—2)

This invention relates to brakes in general, and more particularly to a brake structure constructed to automatically remove foreign matter from within the braking compartment during the operation of the brake.

It is a well-known fact that an appreciable amount of foreign matter such as dust, dirt, and particles of metal collect within the braking compartment formed by the brake drum and backing plate and that this material has a deleterious effect on the efficiency of the brake.

The principal object of the invention is therefore to provide means for automatically removing this material during the braking operation. To this end, there is suggested the shaping of the brake lining on the brake shoes in such fashion as to provide a baffle or scraper member functioning as an impeller to force the foreign matter laterally of the brake shoes toward the opening between the backing plate and the drum head.

Other features of the invention and desirable details of construction will become apparent from the following detailed description of a preferred embodiment of the invention, which embodiment is disclosed in the accompanying drawing in which:

Figure 1 is a side elevation of a brake structure embodying my invention;

Figure 2 is a fragmentary plan view of one of the brake shoes of Figure 1, showing the particular shape of the lining constituting my invention; and Figure 3 is a fragmentary vertical section of the brake of Figure 1, disclosing the brake structure cooperating with my novel lining structure to effect the removal of the foreign matter.

There is disclosed in Figure 1 a two shoe double-acting servo brake, the shoes anchoring on either member 10 or member 12 depending upon the direction of drum rotation. The brake parts are supported on a backing or closure plate 14, which latter part together with the drum constitute the brake housing.

Considerable foreign material such as dust and drum scorings collect within the brake housing, and this material often lowers the efficiency of the brake by materially affecting the coefficient of friction and also possibly scoring the drum.

To the end that this material be automatically removed, there is suggested the cutting away of the conventional brake lining at each end of both of the brake shoes to provide the diagonally extending end faces 16 of Figure 2. The inclination of the end face has been found to be most effective, if the angle, Figure 2, varies between 30 and 60 degrees depending upon the geometry of the brake parts. The end face of each inclined portion is preferably made square, that is extends normal or perpendicular to the rim face of the shoe; furthermore, the end face of the lining of each shoe is preferably oppositely inclined at each end and the inclinations of adjacent shoe ends are also oppositely inclined all for a purpose to be described hereafter.

In the operation of the brake, with a counterclockwise direction of drum rotation, the upper end A (Figure 1) of one of the shoes and the similarly inclined lower end B of the remaining shoe will cooperate to act as baffles to impel the foreign matter toward the opening C (Figure 3) there to be discharged into the surrounding atmosphere. With clockwise rotation of the drum, ends $A^1$ and $B^1$ will function in a similar manner.

While one illustrative embodiment has been described in detail, it is not my intention to limit the scope of the invention to this particular embodiment or otherwise than by the terms of the appended claims.

I claim:

1. A brake structure comprising a brake support plate and a rotor, said parts together defining a braking chamber, and so constructed and so positioned with respect to each other as to provide an opening therebetween, together with stator braking means within said chamber movable into and out of engagement with said rotor, said stator means being provided with a friction element movable therewith and shaped to force foreign matter toward said opening during the rotation of said rotor member to thereby remove said foreign matter from the braking chamber.

2. A brake structure comprising a brake support plate and a rotor, said parts together defining a braking chamber, and so constructed and so positioned with respect to each other as to provide an opening therebetween, together with stator braking means within said chamber, said latter means being provided with a lining material having its end faces inclined to provide a baffle member, said latter member adapted to force foreign matter toward said opening during the rotation of said rotor member to thereby automatically remove foreign matter from the braking chamber.

MARION MORGAN CUNNINGHAM.